United States Patent
Sankaran et al.

(10) Patent No.: US 7,516,084 B1
(45) Date of Patent: Apr. 7, 2009

(54) APPROACH FOR MANAGING FORECAST DATA

(75) Inventors: Sarat C. Sankaran, San Carlos, CA (US); Paul V. Carmody, Round Rock, TX (US); Navneet Singh, W. Pembroke Pines, FL (US); Shivraj K. Ahluwalia, Sunnyvale, CA (US)

(73) Assignee: Lawson Software, Inc., St. Paul, MN (US)

( * ) Notice: Subject to any disclaimer, the term of this patent is extended or adjusted under 35 U.S.C. 154(b) by 673 days.

(21) Appl. No.: 09/905,258

(22) Filed: Jul. 12, 2001

(51) Int. Cl.
G06F 17/30 (2006.01)
(52) U.S. Cl. ........................................ 705/10
(58) Field of Classification Search ............. 705/10
See application file for complete search history.

(56) References Cited

U.S. PATENT DOCUMENTS

| | | | |
|---|---|---|---|
| 5,377,095 A * | 12/1994 | Maeda et al. | 705/10 |
| 5,621,201 A | 4/1997 | Langhans et al. | |
| 5,696,885 A * | 12/1997 | Hekmatpour | 706/59 |
| 5,914,472 A | 6/1999 | Foladare et al. | |
| 6,012,044 A | 1/2000 | Maggioncalda et al. | |
| 6,021,943 A | 2/2000 | Chastain | |
| 6,029,158 A | 2/2000 | Bertrand et al. | |
| 6,073,127 A | 6/2000 | Lannert et al. | |
| 6,173,269 B1 | 1/2001 | Solokl et al. | |
| 6,662,174 B2 * | 12/2003 | Shah et al. | 707/2 |
| 6,804,657 B1 * | 10/2004 | Sultan | 705/10 |
| 6,816,839 B1 * | 11/2004 | Gung et al. | 705/10 |
| 6,941,311 B2 * | 9/2005 | Shah et al. | 707/101 |
| 7,062,447 B1 * | 6/2006 | Valentine et al. | 705/1 |
| 2001/0041996 A1 | 11/2001 | Eder | |
| 2002/0095363 A1 | 7/2002 | Sloan et al. | |

(Continued)

FOREIGN PATENT DOCUMENTS

JP 2002092465 A 3/2002

(Continued)

OTHER PUBLICATIONS

Mentzer et al., Benchmarking Sales Forecasting Management, Business Horizons, May-Jun. 1999, p. 48-56 [Google].*

(Continued)

Primary Examiner—Susanna M Diaz
(74) Attorney, Agent, or Firm—Schwegman, Lundberg & Woessner, P.A.

(57) ABSTRACT

An approach for managing forecast data involving the use of a hierarchical data model to manage forecast data. Each user has forecast data and access is determined based upon the relationships between user and the hierarchical data model. Each relationship is defined by user attributes including a node assignment and primary and secondary forecasting depths for primary and secondary data hierarchies. Access to forecast data is provided by first identifying the user's assigned node in the user's primary data hierarchy and traversing to the relative primary forecasting depth with respect to the user's assigned node. Then the user's secondary data hierarchy is traversed to the absolute secondary forecasting depth. Generally, users are only permitted to change data only at their lowest level, although some users may be given privileges to override forecast data at other levels. A consensus mechanism is also provided for resolving conflict or inconsistencies in forecast data.

11 Claims, 12 Drawing Sheets

U.S. PATENT DOCUMENTS

2002/0107839 A1* 8/2002 Heckerman .................... 707/3
2002/0111890 A1   8/2002 Sloan et al.
2002/0116213 A1* 8/2002 Kavounis et al. ............... 705/1
2002/0116348 A1* 8/2002 Phillips et al. .............. 705/400
2002/0133444 A1   9/2002 Sankaran et al.
2002/0138324 A1* 9/2002 Zarefoss et al. ................ 705/8
2002/0178167 A1* 11/2002 Kootale ..................... 707/100

FOREIGN PATENT DOCUMENTS

WO       WO 02/073365 A2   9/2002

OTHER PUBLICATIONS

Helms et al., Supply Chain Forecasting—Collaborative Forecasting Supports Supply Chain Management, Business Process Management Journal, vol. 6, No. 5, 2000 [Dialog: file 15].*

ClosedLoop Solutions' archived web page, [URL: http://web.archive.org/web/20000619170815/http://www.cloop.com/], archived on Jun. 19, 2000 by the Internet Archive Wayback Machine.*

* cited by examiner

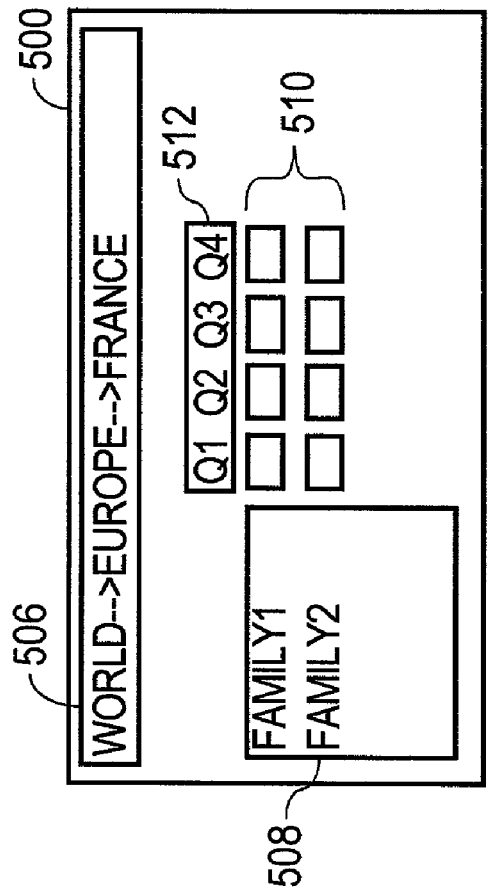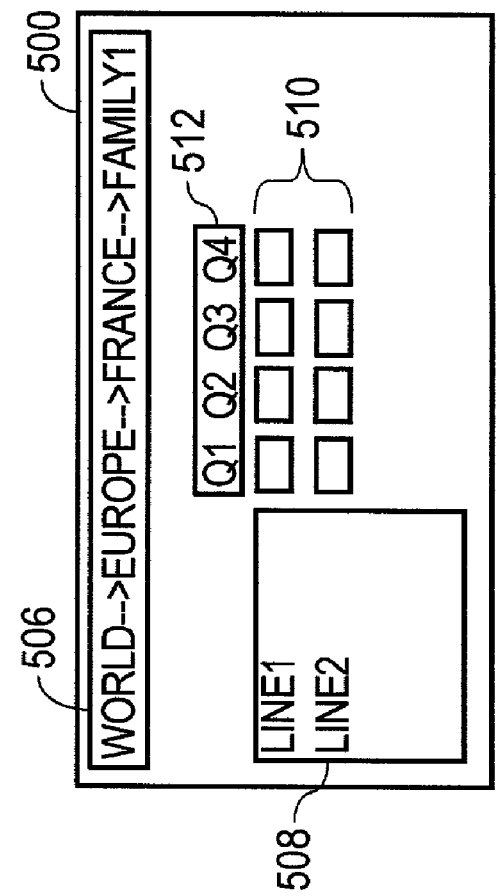
FIG. 5D
FIG. 5E

|  | U.S. SALES | U.S. DIFF VS. MARKETING | CANADA SALES | CANADA DIFF VS. MARKETING | FRANCE SALES | FRANCE DIFF VS. MARKETING | GERMANY SALES | GERMANY DIFF VS. MARKETING |
|---|---|---|---|---|---|---|---|---|
| LINE 1 | 4,900 | -128 | 4,083 | 98 | 8,983 | 360 | 3,552 | -105 |
| LINE 2 | 6,236 | 226 | 5,197 | 188 | 11,433 | 529 | 4,521 | -200 |
| LINE 3 | 6,398 | (-1737) | 5,332 | 730 | 11,730 | (-3384) | 4,639 | (1121) |
| LINE 4 | 5,507 | 157 | 4,589 | -107 | 10,097 | -213 | 3,993 | -198 |
| TOTAL | 17,534 | -1,639 | 14,612 | 1,016 | 32,146 | -2,495 | 12,712 | 816 |

|  | U.S. | CANADA | FRANCE | GERMANY |
|---|---|---|---|---|
| LINE 1 | 4,900 | 4,083 | 8,983 | 3,552 |
| LINE 2 | 6,236 | 5,197 | 11,433 | 4,521 |
| LINE 3 | 6,398 | 5,332 | 11,730 | 4,639 |
| LINE 4 | 5,507 | 4,589 | 10,097 | 3,993 |

APPROACH FOR MANAGING FORECAST DATA

FIELD OF THE INVENTION

The present invention relates to information management generally, and more specifically, to an approach for managing forecast data.

BACKGROUND OF THE INVENTION

Forecasting is a very important function performed by businesses. Businesses need to be able to accurately forecast to manage current operations and plan for future growth or contraction. Businesses need to forecast expected sales as well as their expected expenses. In general, it is more important, and more difficult, to establish accurate revenue (sales) forecasts than expense forecasts because the external marketplace is generally much more volatile and unpredictable than the internal operations of the company doing the forecasting. For example, customers may accept new technologies at different rates than expected, competitors may change prices, or product launches may be delayed, all of which may affect future revenue. The ability to acquire and process frequent snapshots of forecast data allows companies to improve financial predictability and to increase organizational responsiveness.

For public companies, financial predictability is important for maintaining good external relations with investors. Business executives are experiencing increased scrutiny of their revenue forecasts. For example, chief financial officers (CFOs) are typically charged with ensuring that company performance meets or exceeds investment analysts' expectations. CFOs often provide "guidance" to analysts to raise or lower their estimates based on how well the CFO thinks the company will perform over a particular time period. Given the current volatility in the stock market, reactions to companies that do not meet expectations can cause severe changes in stock prices. In addition, the job security for many CFOs is often tied to their ability to accurately predict the performance of their business organizations.

Financial predictability also allows business organizations to respond quickly to changes in the market place. By rapidly refreshing revenue estimates, business managers can get a sense of how well their organization is performing. If their organization is performing well, business managers may decide to take operational actions such as raising prices. If their organization is performing poorly, business managers may try to motivate the sales force to increase sales. Making effective operational adjustments to business organizations is only possible if business managers have an accurate view of the marketplace provided by accurate forecasts.

In addition to taking operational actions, business managers may make resource allocation changes based on refreshed revenue forecasts. For example, business managers may decide to change headcount more quickly or slowly. As another example, business managers may decide to accelerate or delay expenditures tied to revenue projections, such as research and development projects. Thus, providing a forecasting mechanism and environment to help business organizations achieve financial predictability and organizational responsiveness is extremely valuable to companies.

There are two general impediments to business organizations achieving financial predictability. First, business organizations are composed of many different constituent groups with different perspectives on the future. Second, processes and systems are not in place to quickly collect and compare information. In most business organizations, the sales and marketing organizations influence the organization's perspective on what future revenues will be.

The sales organization is on the ground selling the products and has regular interaction with customers that is a valuable source of information about the future. For example, sales representatives may have the best information about when customer deals will close, how fast new products will be adopted, and how difficult it is to achieve a particular price point. The sales organization is usually given quotas by quarter and has a compensation structure that is largely based on achieving quotas, putting the focus clearly on the near-term. As a result, forecasts by the sales organization tend to be relatively accurate for the current quarter and possibly the next quarter, but are usually heavily discounted for time periods further out.

The marketing organization, which is sometimes referred to as the product or business unit organization, is responsible for inbound and outbound marketing. Inbound marketing is an assessment of customer needs and identification of target markets. Outbound marketing is the generation of marketing collateral, public relations and events. The marketing organization is sometimes also responsible for pricing and product strategy. Product marketers will often control when product launches occur. Therefore, the marketing organization knows a lot about macro market conditions that could affect revenue. Because marketing does not typically deal with individual customers on a day-to-day basis, marketing forecasts tend to be more valid over the medium and long-term. Product marketers may have revenue, gross profit, or even full responsibility for the profit and loss of their products, so they may have an important interest in forecasting financial performance.

For many businesses, the optimal revenue forecast is achieved by having the sales and marketing organizations agree upon an "official" or "consensus" revenue forecast. This consensus-generation practice (as opposed to taking just one forecast or the other, or by allowing separate forecasts to remain divergent) is often superior for two reasons. First, the process of achieving consensus forces constituents to reveal information and state implicit assumptions, resulting in a more informed forecast. Second, expenses must be driven off a coherent pro form a (forecast) profit and loss (P&L) statement. If managers in the company are spending based on divergent P&L forecasts, then the business organization's resources may not be coherently aligned towards an objective. Because the sales and marketing organizations often forecast slightly different ways, e.g., sales, forecasts all products in a given region while marketing forecasts all regions for given product, and because often the sales and marketing organizations are hierarchically deep and may only come together at the chief executive officer (CEO) level, getting the sales and marketing organizations to agree on official revenue forecast in a timely manner is a huge organizational challenge.

Based on industry, individual business practices, and organizational capabilities, companies reforecast revenue at frequencies ranging from once a year to real-time. As an example, in many companies, forecasting is organized into a set of processes often named the Annual Operating Plan (AOP), the Outlook process, and the Flash process. During AOP process, companies set their revenue, expense, and capital budget plans for the upcoming fiscal year. A major component of all of these processes is revenue forecasting.

Outlook processes are used to update and extend the forecast in the AOP, but usually in less detail. In the Outlook process, the group in the company responsible for Financial Planning and Analysis (FP&A) usually coordinates a rollup of forecasts from both the Sales organization and the Marketing organization. Often, both organizations are required to specify their forecasts in some level of dimensional detail. Usually this level of detail is revenue by product family (major product area) and region (e.g., Europe). In some situations, revenue forecasts are based upon bookings instead of revenue. Bookings are created when orders are taken while revenue may not be recognized until a product has been sent to the customer. Sales and marketing may be required to forecast revenue, bookings, or both.

Once the forecasts have been rolled up, the FP&A organization then conducts a meeting to identify and resolve discrepancies in the separate forecasts. This is often called an "alignment," "sync-up," or "convergence" meeting. The result of this meeting is the official revenue forecast that is provided to business managers to make operational and resource decisions. At some point in the process, either in the rollup or after the convergence meeting, forecasts based upon bookings are converted to a revenue basis.

The Flash process may be identical in format to the outlook process, but with a shorter time horizon (e.g., the current quarter only). More typically, only the forecast from the sales organization is rolled up and used as the official forecast, obviating the need for the consensus meeting.

Business organizations use a variety of systems and mechanisms to manage forecast data. One approach involves the use of spreadsheet-based solutions. Spreadsheet-based solutions generally involve the use of a patchwork of spreadsheets that are communicated between personnel via e-mail. Forecasts are generated in spreadsheets and are subsequently e-mailed to each level of the respective organizational hierarchies for review. Ultimately, a set of top-level spreadsheets are e-mailed to FP&A personnel in order to produce the Flash process forecasts or organize the consensus meeting for the Outlook process forecasts. The output of both processes is usually a set of spreadsheets that is e-mailed to various personnel within the business organization. Spreadsheet-based solutions are popular because spreadsheet application software is readily available, is inexpensive, is generally very flexible and is relatively easy to learn and use.

Despite the benefits provided by the use of spreadsheets, spreadsheet-based solutions have several drawbacks for use in managing forecast data. First, spreadsheets are error-prone. The free-form flexibility of a spreadsheet means that individual users can modify the fundamental spreadsheet structure, e.g., change column and row structures or edit or overwrite formulas, which makes consolidating forecasts from multiple individuals tricky and error-prone. Second, enforcing version control is difficult. Users of spreadsheets have the ability to save different versions to their local computers or on networks with any naming convention. As a result, business organizations must rely upon individual users to enforce their own version control through diligence in naming files and creating directories in which to store spreadsheet files. Third, consolidating spreadsheet data from multiple users can be extremely difficult and labor intensive. Individuals responsible for consolidating data must ensure that they have the most recent version of each spreadsheet and then must manually consolidate the data. Manual consolidation is complicated by non-standard formatting.

Another approach for managing forecast data involves the use of demand planning products. Demand planning software is primarily intended to help individual users generate statistically-based forecasts and then disaggregate forecasts into the very detailed level of information needed for manufacturing planning and supply chain management. One example of a demand planning product is i2 Technologies' Demand Planner. Demand planning products are difficult, if not impossible, to use for revenue forecasting for several reasons. First, demand planning products are mainly intended to provide unit volume demand forecasts to manufacturing organizations. This is because manufacturing organizations are primarily concerned with knowing the demand in unit volume for particular products. Consequently, many demand planning applications are poorly suited for tracking revenue information. Second, many demand planning products are designed for a single or small number of users. As described earlier, the revenue forecasting process involves collecting forecasts from an entire organizational hierarchy in the sales organization as well as collaboration among constituencies to arrive at a consensus. Systems that are designed primarily for use by a small set of "power users" often do not have good user interfaces. Furthermore, such systems do not have good aggregation mechanisms for collecting distributed forecast data.

Another solution to the problem of managing forecast data involves the use of sales force automation (SFA) applications to generate revenue forecast data. SFA applications are designed generally to help sales representatives track details of discrete sales opportunities. Despite their effectiveness in this regard, SFA applications have several significant drawbacks. One drawback of SFA applications generally do not use any input from marketing organizations and use short-term sales opportunity data. This occurs primarily because the sales pipeline tapers off over time since discrete sales opportunities will only be identified a certain amount of time in the future. The result is that just reporting on the sales pipeline is generally insufficient for revenue forecasting purposes.

Another drawback of SFA applications is that support for product detail is generally poor. For example, some SFA systems do not support the ability to specify products in an opportunity, but rather only the total amount of the deal. Those SFA systems that do support products only support a limited number of products. Supporting a limited number of products or product details makes financial forecasting difficult because adequate comparisons with marketing cannot be made. For example, marketers forecast by product, so without a corresponding sales forecast by product, comparisons other than at the total level are impossible. Also, insufficient product detail makes forecasting gross margin difficult since gross margin varies by product, and there is insufficient detail for manufacturing.

Based upon the need for business organizations to accurately and quickly manage and process forecast data, an approach for managing forecast data that does not suffer from the limitations of conventional approaches is highly desirable. There is a particular need for an approach for managing forecast data from a large number of disparate sources and for maintaining forecast data at product levels. There is a further need for an approach for controlling access to forecast data that does not suffer from limitations in prior approaches.

SUMMARY OF THE INVENTION

According to one aspect of the invention, a method is provided for managing access to forecast data. The method includes identifying, from a plurality of customers, a set of one or more customers associated with a particular user. The method also includes selecting a set of one or more products from a plurality of products. The method further includes allowing the particular user to access forecast data for the set of one or more products for each customer from the set of one or more customers.

According to another aspect of the invention, another method is provided for managing access to forecast data. The method includes identifying, from a plurality of products, a set of one or more products associated with a particular user. The method also includes selecting a set of customers from a plurality of customers. The method further includes allowing the particular user to access forecast data for the set of one or more customers for each product from the set of one or more products.

According to another aspect of the invention, an apparatus is provided for managing forecast data. The apparatus includes a storage device containing customer hierarchy data and products hierarchy data and a processor communicatively coupled to the storage device. The processor is configured to process the customer hierarchy data and the products hierarchy data to control access to forecast data.

According to another aspect of the invention, a computer-readable medium is provided for managing access to forecast data. The computer-readable medium carries customer data hierarchy data, products data hierarchy data; and one or more sequences of one or more instructions which, when processed by one or more processors, cause the one or more processors to perform the steps of: identify a set of one or more customers associated with a particular user from a plurality of customers defined by the customer data hierarchy data, select a set of products from a plurality of products defined by the products data hierarchy data, and allow a user to access forecast data for the set of one or more products for each customer from the set of one or more customers.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5D depicts the state of forecasting environment after the user has requested access to forecast data for FRANCE.

FIG. 5E depicts the state of forecasting environment after the user has requested access to forecast data for FAMILY1.

FIG. 6C contains a table that depicts a user workflow accomplished in the consensus environment.

FIG. 6D is an example user interface that allows new consensus forecast data to be entered by users.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Various aspects of the invention are described in the following sections: (1) Overview; (2) Hierarchical Data Model; (3) Structure and Content of Data Hierarchies; (4) Using Organizations to Simplify User Administration and Establish Workflow; (5) Using Organizations and Data Hierarchies to Manage Access to Forecast Data; (6) Using Forecasting Depths to Tailor Forecasting Granularity; (7) Forecasting Environments; (8) Forecast Roll-Up; (9) Formatting Constraints; (10) Consensus Environment; (11) Implementation Mechanisms; and (12) Example Implementation.

1. Overview

An approach for managing forecast data is provided. The approach involves the use of a hierarchical data model to manage forecast data. Forecast data is maintained for each user. User access to forecast data is determined based upon the relationship between users and the hierarchical data model.

Figure 1:
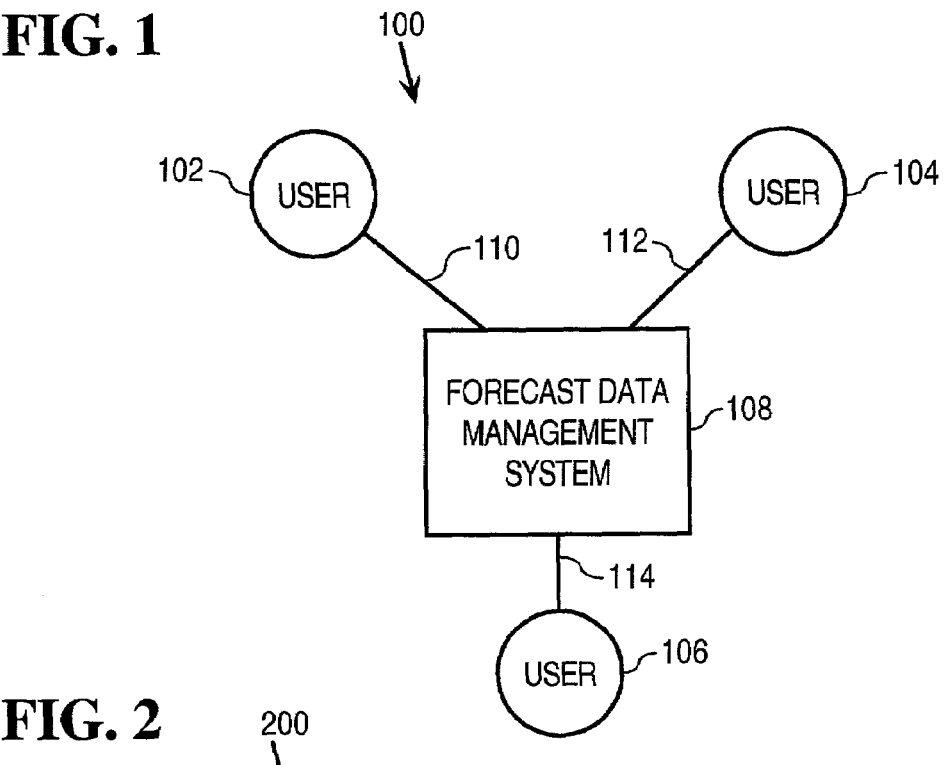
FIG. 1 is a block diagram that depicts an arrangement for managing access to forecast data according to an embodiment.

FIG. 1 is a block diagram that depicts an example arrangement 100 on which the approach for managing forecast data may be implemented. Arrangement 100 includes users 102, 104, 106 that are communicatively coupled to a forecast data management system 108 via communications links 110, 112, 114, respectively. Communications links 110, 112, 114 may be implemented by any medium or mechanism that provides for the exchange of data between users 102, 104, 106 and forecast data management system 108. Examples of communications links 110, 112, 114 include, without limitation, a network such as a Local Area Network (LAN), Wide Area Network (WAN), Ethernet or the Internet, or one or more terrestrial, satellite or wireless links. Forecast data management system 108 may include storage for storing forecast data and a processing mechanism for processing user requests for forecast data.

Figure 2:
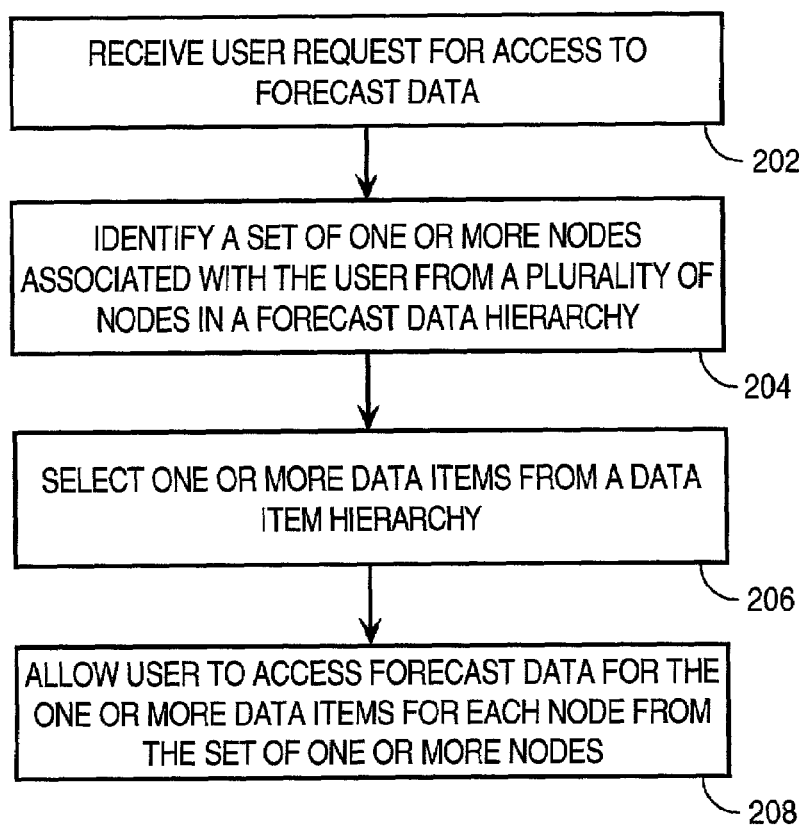
FIG. 2 is a flow diagram that depicts an approach for managing access to forecast data according to an embodiment.

FIG. 2 is a flow diagram 200 of an approach for managing access to forecast data using a hierarchical data model according to an embodiment. In step 202, a request for access to forecast data is received from a user. For example, user 102 may submit a request to access forecast data to forecast data management system 108 over link 110. The request may be any type of request, such as an HTTP request transmitted over the Internet.

In step 204, a set of one or more nodes associated with the user is identified from a plurality of nodes in a forecast data hierarchy. The one or more nodes may be identified by traversing the first forecast data hierarchy to a first depth.

In step 206, one or more data items are selected from a plurality of data items in a data item hierarchy. In step 208, the user is allowed access to forecast data for the one or more forecast data items for each node from the set of one or more nodes.

In one embodiment, the first data hierarchy is a customer data hierarchy and the second data hierarchy is a product data item hierarchy. In this situation, the user is allowed access to forecast data for one or more product data items for each of the one or more customers associated with the user. In another embodiment, the first data hierarchy is a product data hierarchy and the second data hierarchy is a customer data hierarchy. In this situation, the user is allowed access to forecast data for one or more customers for each of the one or more products associated with the user. Using this approach, access to forecast data is controlled based upon users' relationships with forecast data hierarchies.

2. Hierarchical Data Model

As previously described herein, the approach for managing access to forecast data is based upon a hierarchical data model. According to one embodiment, the hierarchical data model used includes the use of one or more data hierarchies. Any type or number of data hierarchies may be used depending upon the requirements of a particular application and the invention is not limited to any particular type or number of data hierarchies. For purposes of explanation, embodiments of the invention are described hereinafter in the context of using a product data hierarchy and a customer data hierarchy.

3. Structure and Content of Data Hierarchies

According to one embodiment, data hierarchies are each defined by a data hierarchy definition and a forecast elements definition. A data hierarchy definition defines and names each level in a data hierarchy. A forecast elements definition is an instance of a data hierarchy definition and as such, defines a particular data hierarchy that is defined by a data hierarchy definition.

Figure 3A:
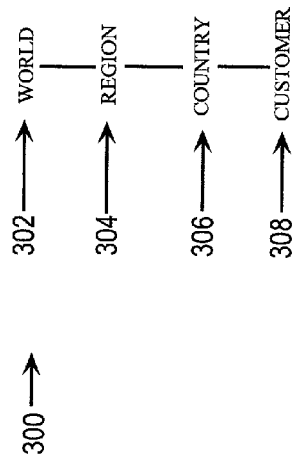
FIG. 3A is a block diagram that depicts a data hierarchy definition according to an embodiment.

FIG. 3A is a block diagram that depicts a data hierarchy definition 300 according to an embodiment. Data hierarchy definition 300 defines a customer data hierarchy structure that includes four hierarchical levels: WORLD 302, REGION 304, COUNTRY 306 and CUSTOMER 308. Data hierarchy definition 300 defines a tree structure where each hierarchical level is related to one or two other hierarchical levels as indicated by the connecting lines. It should be noted that although data hierarchy definition 300 defines a particular data organization based upon geographical attributes of customers, e.g., geographical location, other customer attributes may be used depending upon the requirements of a particular application. For example, customers might be organized by customer technology or size.

Figure 3B:
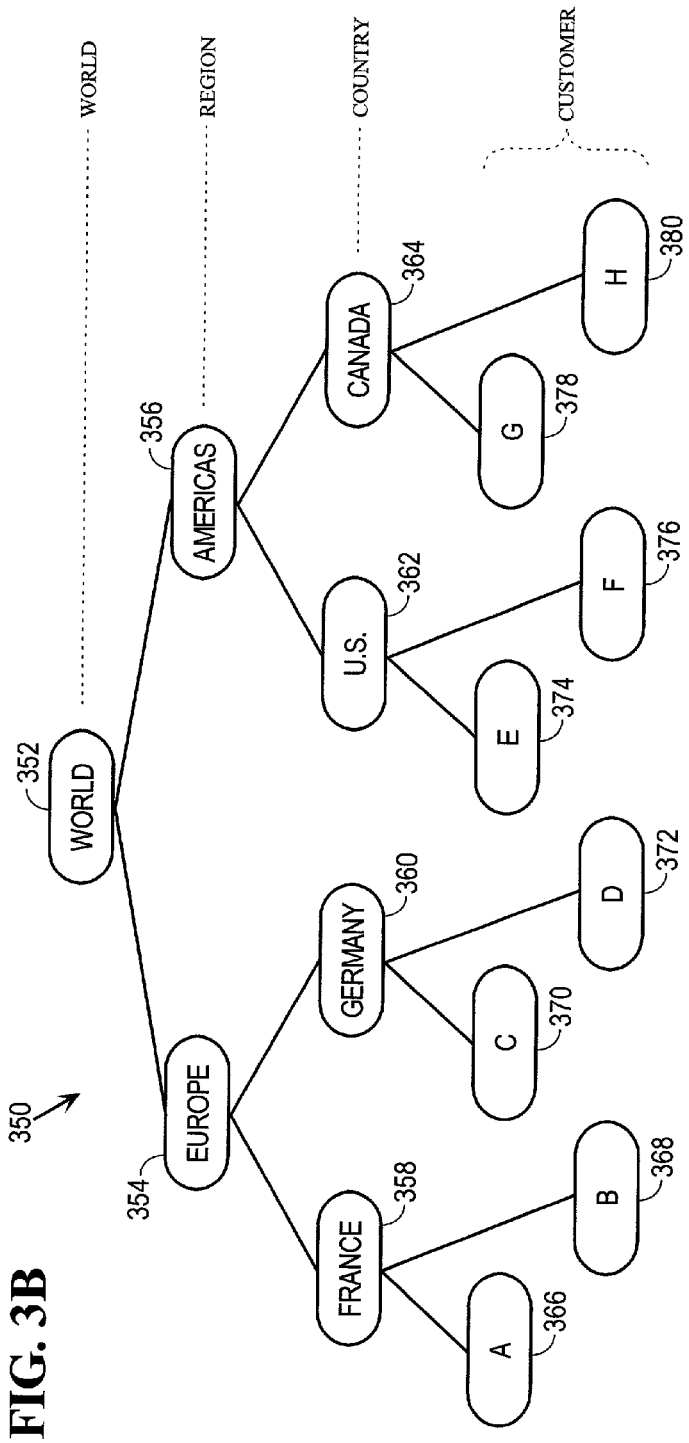
FIG. 3B is a block diagram that depicts a forecast elements definition in the form of a customer data hierarchy.

FIG. 3B is a block diagram that depicts a forecast elements definition 350, i.e., a particular instance of data hierarchy definition 300, in the form of a customer data hierarchy 350. Customer data hierarchy 350 includes one forecast element at the WORLD 302 level, namely, WORLD item 352, two forecast elements at the REGION 304 level, namely, EUROPE 354 and AMERICAS 356, four forecast elements at the COUNTRY 306 level, namely, FRANCE 358, GERMANY 360, U.S. 362 and CANADA 364, and eight forecast elements at the CUSTOMER 308 level, namely, A 366, B 368, C 370, D 372, E 374, F 376, G 378 and H 380. The data for any particular forecast element (node) may be determined from the data at all nodes below the particular node.

Figure 4A:
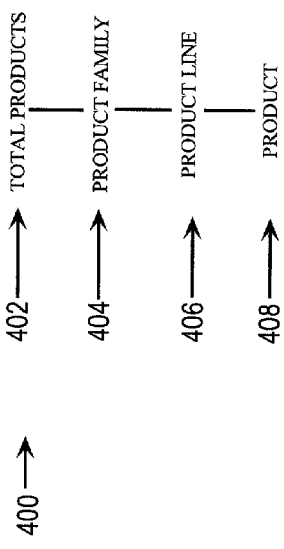
FIG. 4A is a block diagram that depicts another data hierarchy definition according to an embodiment.

FIG. 4A is a block diagram that depicts a data hierarchy definition 400 according to an embodiment. Data hierarchy definition 400 defines a product data hierarchy structure that includes four hierarchical levels: TOTAL PRODUCTS 402, PRODUCT FAMILY 404, PRODUCT LINE 406 and PRODUCT 408.

Figure 4B:
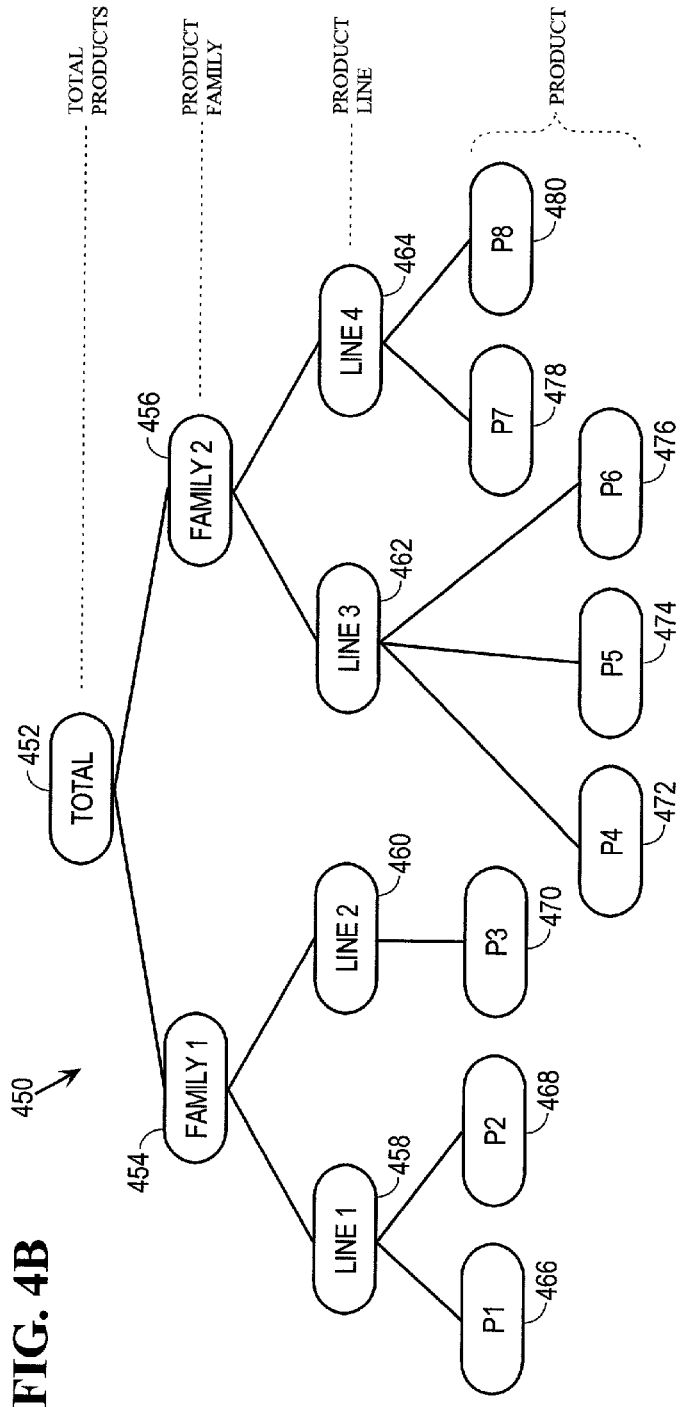
FIG. 4B is a block diagram that depicts a forecast elements definition in the form of a product data hierarchy.

FIG. 4B is a block diagram that depicts a forecast elements definition 450, i.e., a particular instance of data hierarchy definition 400, in the form of a product data hierarchy 450. Product data hierarchy 450 includes one forecast element at the TOTAL PRODUCTS 402 level, namely, TOTAL item 452, two forecast elements at the PRODUCT FAMILY 404 level, namely, FAMILY 1 454 and FAMILY 2 456, four forecast elements at the PRODUCT LINE 406 level, namely, LINE 1 458, LINE 2 460, LINE 3 462 and LINE 4 464, and eight forecast elements at the PRODUCT 408 level, namely, P1 466, P2 468, P3 470, P4 472, P5 474, P6 476, P7 478 and P8 480.

4. Using Organizations to Simplify User Administration and Establish Workflow

For purposes of convenience and for organizing a rollup of forecasts, users may be assigned to an Organization. An organization represents a group of users who will develop a forecast. Examples of organizations are Sales, Marketing, and Finance (who may also be given the name "Consensus" corresponding to their role in the forecasting process). In one embodiment, each organization is assigned a primary data hierarchy and a secondary data hierarchy. Each user assigned to the organization may be assigned to one or more nodes in the primary hierarchy (e.g., a user assigned to the Sales organization may be assigned to WORLD node 352). By restricting the number of possible nodes for assignment (only the Customer hierarchy vs. both the Customer hierarchy and Product hierarchy), organizations simplify user administration because users in each organization share the same perspective on how to view data (in Sales organizations, typically first by customer then by product; in Marketing organizations, typically first by product and then by customer).

Second, the establishment of an organization and the assignment of a primary data hierarchy establish a path to roll up forecasts for management review. By "roll up", it is meant that a forecast from a subordinate in an organization is made visible for judgment by his or her superior. For example, if two users have been assigned to the sales organization and one of those users is assigned to WORLD node 352 and another is assigned to EUROPE node 354, then the customer data hierarchy indicates that any forecasts by the user assigned to EUROPE node 354 will roll-up to the user assigned to WORLD node 352 by virtue of WORLD node 352 being the parent node of EUROPE node 354 in customer data hierarchy 350. This convention dramatically simplifies configuration of the application in instances when it is desirable to generate forecasts at a lower level of a hierarchical organization, such as sales, with various management review points before senior manager in the organization (assigned to the root node in the hierarchy) determines the top-level forecast for the organization.

5. Using Organizations and Data Hierarchies to Manage Access to Forecast Data

According to one embodiment, a combination of organization assignment and a data hierarchy may be used to manage access by users to forecast data. Referring to customer data hierarchy 350 of FIG. 3B, suppose that a particular user in a sales organization is assigned to customer A 366. For example, the particular user may be assigned to service the customer A account. Thus, in this example, this user is allowed access to information for customer A 366 at some level of detail in the product data hierarchy in FIG. 4B (the level of granularity permitted in this dimension is discussed in the next section). Consequently, the data hierarchy has been used to control user access.

As will be described in more detail, a forecast environment for a particular user may define not only what data the particular user can access, but also how the particular user can access the data. In this example, "access" may refer to read-only access or read-write access, depending upon the requirements of a particular application. In the previous example, the particular user was given access to a single customer. Users may be given access to multiple customers and/or multiple products, depending upon the requirements of a particular application. The particular customers and products to which users are given access are based upon the organization(s) and data hierarchy nodes to which the user is assigned. For example, the particular user may be assigned to the FRANCE 358 and the GERMANY 360 node in customer data hierarchy 350.

6. Using Forecasting Depths to Tailor Forecasting Granularity

According to one embodiment, forecasting depth levels are used with data hierarchies to tailor the granularity of the forecasting environment for each user. Each organization, such as sales or marketing, is assigned a forecasting depth level for each data hierarchy. The forecasting depth levels may be absolute with respect to the root level of a data hierarchy, or may be relative with respect to a node to which a user is assigned, depending upon the requirements of a particular application.

According to one embodiment, users inherit a primary forecasting depth for their primary data hierarchy and a secondary forecasting depth for their secondary data hierarchy from their assigned organizations. For purposes of explanation, primary forecasting depths are relative and secondary forecasting depths are absolute. The characterization of a data hierarchy as being "primary" or "secondary" with respect to a particular user depends generally upon the relationship between the particular user and the data hierarchies. For example, for a particular user in a sales organization (customer centric), customer data hierarchy 350 is the particular user's primary data hierarchy and product data hierarchy 450 is the particular user's secondary data hierarchy. For a user in a marketing organization (product centric), product data hierarchy 450 is the particular customer's primary data hierarchy and customer data hierarchy 350 is the particular user's secondary data hierarchy.

The user's primary data hierarchy is traversed downward starting from the user's assigned node to the primary forecasting depth. Once the user's primary forecasting depth is reached, then the user's secondary data hierarchy is traversed, starting from the top, down to the user's secondary forecasting depth. For example, suppose that a particular user in a sales organization is assigned to the EUROPE 354 node of customer data hierarchy 350. Suppose further that the particular user is assigned a primary forecasting depth (relative) of one and a secondary forecasting depth (absolute) of three. First, the user's primary data hierarchy, which in this example is customer data hierarchy 350, is traversed downward starting from the particular user's assigned node of EUROPE 354 to the user's primary forecasting depth of one, or to the country 306 level. Then, the user's secondary data hierarchy, which in this example is product data hierarchy 450, is traversed downward from the top to the user's secondary forecasting depth of three, or to the product line 406 level. Thus, in this situation, the particular user is allowed access to forecast data for product lines LINE1 458, LINE2 460, LINE3 462 and LINE4 464 for both FRANCE 358 and GERMANY 360.

As another example, suppose that a particular user in a marketing organization is assigned to the LINE1 node 458 of product data hierarchy 450. The particular user may be responsible for the LINE1 product line. Suppose further that the particular user is assigned a primary forecasting depth (relative) of one and a secondary forecasting depth (absolute) of three. In this situation, the particular user is allowed access to forecast data for countries FRANCE 358, GERMANY 360, U.S. 362 and CANADA 364, with respect to products P1 and P2.

7. Forecasting Environments

Forecasting environments are defined by the data hierarchy definitions for applicable data hierarchies and user attributes. According to one embodiment, user attributes include a user type, an assigned organization and a node assignment.

The user type may be administrator, regular user or observer user. Administrative users have privileges to perform various administrative functions. Example administrative functions include, without limitation, establishing the content and structure of data hierarchies, including establishing and maintaining data hierarchy definitions and forecast elements definitions, and establishing and maintaining user attributes. Regular users have read/write privileges for forecast data that they are permitted to access. Observer users have only read privileges for forecast data that they are permitted to access.

Example assigned organizations include sales, marketing and consensus. According to one embodiment, users may be assigned to only one organization. As previously described herein, users are assigned to one or more nodes in a data hierarchy. Sometimes users are assigned to nodes based upon their responsibilities within an organization. For example, referring to FIG. 3B, a regional manager in a sales organization might be assigned to a region node, e.g., EUROPE 354, or to a country node, e.g., CANADA 364. As another example, a product line manager in a marketing organization might be assigned to a product family, e.g., FAMILY1 454, or to a particular product line, e.g., LINE4 464. Depending upon the particular user interface employed, user data may also include login verification data, such as a user identification and password, and an email address.

FIGS. 5A-5E are a set of block diagrams that depict an example forecasting environment 500 that is based upon a hierarchical data model according to an embodiment. More particularly, FIGS. 5A-5E are a set of block diagrams that depict an example forecasting environment 500 that is based upon the customer data hierarchy 350 and product data hierarchy 450 described herein.

Figure 5A:
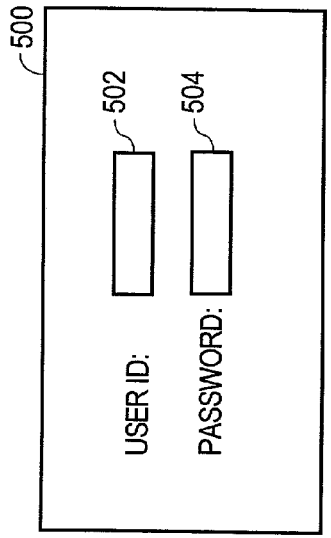
FIG. 5A is a block diagram that depicts a login process in a forecasting environment.

In FIG. 5A, forecasting environment 500 includes a User ID field 502 and a password field 504 that provide a user login mechanism. As with conventional login approaches, users are assigned IDs and passwords based upon the privileges to be granted to the users. A user enters a user ID and password into User ID field 502 and password field 504, respectively, and the user ID and password are validated. A variety of validation techniques may be employed and the invention is not limited to any particular validation technique.

Figure 5B:
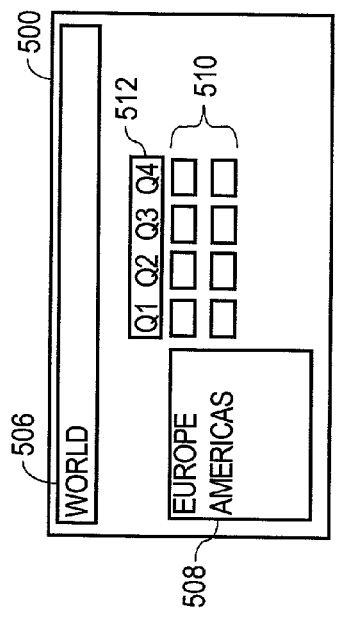
FIG. 5B illustrates forecasting environment after a user's login as been validated.

FIG. 5B illustrates forecasting environment 500 after a user's login has been validated. In this state, forecasting environment 500 includes a navigation location object 506 that specifies the current navigation "location" within customer data hierarchy 350 and product data hierarchy 450. For purposes of explanation, it is presumed that the particular user is a regular user type and is assigned to a sales organization. Thus, the particular user's primary data hierarchy is customer data hierarchy 350 and the user's secondary data hierarchy is product data hierarchy 450. In this example, the particular user is assigned to the WORLD 352 world-level node with a primary forecasting depth of two and a secondary forecasting depth of three. As indicated by the contents of navigation location object 506, the particular user begins at the WORLD 352 node of customer data hierarchy 350.

Forecasting environment 500 also includes a navigation selection object 508 that indicates the navigation selections available to the particular user. The current navigation location within customer data hierarchy 350 and product data hierarchy 450 defines the available navigation choices. In the present example, since the current location in customer data hierarchy 350 is the WORLD 352 node, the available navigation selections are the EUROPE 354 or AMERICAS 356 regions at the REGION level 304. The EUROPE 354 and AMERICAS 356 region choices are reflected by navigation selection object 508.

Forecasting environment 500 also includes a set of forecast data objects 510 that specify current forecast data, if any, for the EUROPE 354 and AMERICAS 356 regions. A forecast data label object 512 specifies that the data contained in forecast data objects 510 is quarterly data, i.e., quarters Q1-Q4, for the EUROPE 354 and AMERICAS 356 regions.

It should be noted that in the present example, the user is assigned to the WORLD 352 world-level node with a primary forecasting depth of two and a secondary forecasting depth of three and therefore is allowed access to forecast data for product lines LINE1, LINE2, LINE3 and LINE4 for FRANCE, GERMANY, U.S. and CANADA. The user may or may not be allowed access to forecast data at higher levels in customer data hierarchy 350, depending upon the requirements of a particular application. Thus, in FIG. 5B, the data contained in forecast data objects 510 for the WORLD 352 node, corresponding to EUROPE and AMERICAS, may not be visible or otherwise available to the user. According to another embodiment, users are given read-only access to forecast data for higher levels so that they can view the rolled-up totals. In the situation for the present example, data contained in forecast data objects 510 for the WORLD 352 node is made available to the user on a read-only basis.

Continuing with FIG. 5B, the user selects either the EUROPE 354 region or the AMERICAS 356 region depending upon which forecast data for the constituent countries the user wants to access, i.e., forecast data for FRANCE 358 and GERMANY 360 for the EUROPE 354 region, or for U.S. 362 and CANADA 364 for the AMERICAS 356 region. The particular approach by which the user selects the EUROPE 354 region or the AMERICAS 356 region within navigation selection object 508 may vary depending upon the requirements of a particular application and the invention is not limited to any particular approach. For example, in a situation where forecasting environment 500 is embodied in a graphical user interface (GUI), navigation selection object 508 may contain user interface objects associated with the EUROPE 354 and AMERICAS 356 regions that may be individually selected by the user using a mouse, trackball, keyboard, or other selection mechanism.

Figure 5C:
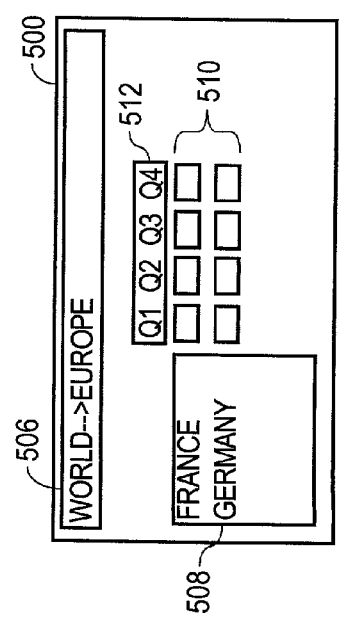
FIG. 5C depicts the state of forecasting environment after the user has requested access to forecast data for the EUROPE region.

FIG. 5C depicts the state of forecasting environment 500 after the user has requested access to forecast data for the EUROPE 354 region. Navigation location object 506 has been updated to reflect that the user has selected the EUROPE 354 region. Navigation selection object 508 specifies the constituent countries for the EUROPE 354 region, namely FRANCE 358 and GERMANY 360. Forecast data objects 510 contain forecast data for quarters Q1-Q4 for FRANCE 358 and GERMANY 360.

FIG. 5D depicts the state of forecasting environment 500 after the user has requested access to forecast data for FRANCE. Navigation location object 506 has been updated to reflect that the user has selected FRANCE 358. Navigation selection object 508 specifies the constituent product families for FRANCE 358, namely FAMILY1 454 and FAMILY2 456. It should be noted that the reason why the user selecting FRANCE FIG. 5C did not cause customers A and B to be displayed in navigation selection object 508 in FIG. 5D is because the user is assigned to the WORLD 352 world-level node and the user's primary forecasting depth is two. Having fully traversed customer data hierarchy 350 to the user's primary forecasting depth, navigation proceeds to the user's secondary data hierarchy, which in this example is product data hierarchy 450. Had the user's primary forecasting depth been three instead of two, then selecting FRANCE would allow the user to access forecast data for customers A and B. Forecast data objects 510 contain forecast data for quarters Q1-Q4 for the FAMILY1 454 and FAMILY2 456 product family nodes.

FIG. 5E depicts the state of forecasting environment 500 after the user has requested access to forecast data for FAMILY1. Navigation location object 506 has been updated to reflect that the user has selected FAMILY1. Navigation selection object 508 specifies the constituent product lines for FAMILY1, namely LINE1 and LINE2. Forecast data objects 510 contain forecast data for quarters Q1-Q4 for product lines LINE1 and LINE2. The product line level is the most granular forecast data accessible to the user since the user's secondary forecasting depth is three. If the user's secondary forecasting depth were four, then the user would be able to access products P1-P8 through selecting the appropriate product lines through navigation selection object 508.

In the foregoing example, the traversing of the data hierarchies began at the user's assigned node in the user's primary data hierarchy and proceeded to the relative forecasting depth with respect to the user's assigned node. Then the user's secondary data hierarchy is traversed to the absolute secondary forecasting depth. According to one embodiment, users are permitted to change data only at their lowest level, as defined by the user's attributes. Thus, in the prior example, the user would be able to change forecast data at only the product line level, i.e., product lines LINE1 and LINE2 for FRANCE, and LINE3 and LINE4 for GERMANY.

8. Forecast Roll-Up

Users may use their forecasting environments to create forecasts. As mentioned in the section "Using Organizations and Data Hierarchies to Manage Access to Forecast Data", the primary data hierarchy of the organization may define the rollup of multiple independent forecasts.

For example, if a user assigned to the sales organization is assigned to the EUROPE node 354, then his or her forecast will roll up to user(s) assigned to the WORLD node 352 for review. In this example, if sales organization has primary forecast depth of one (relative) and secondary forecast depth of three (absolute), then Europe forecasts LINE1, LINE2, LINE3, and LINE4 for Germany and France. Since the user at World is also assigned to the sales organization, he or she forecasts LINE1, LINE2, LINE3, and LINE4 for Europe and Americas.

Assume that Europe has forecast for the first quarter $100 for France LINE1, $50 for France LINE2, $30 for Germany LINE1, and $55 for Germany LINE3 (there is no forecast for LINE4 for either France or Germany). Assume that World has a forecast for Europe LINE1 of $180 and Europe LINE4 of $40. Based on this forecast by Europe, when the user assigned to World logs in, he or she will see the forecast from Germany at appropriate points in his or her forecast environment.

For example, when the World user logs in, he or she will see the first level of drill-down, namely Europe and Americas. In addition to his or her own forecast, the user will see the appropriate rollup of Europe's forecast. In this case, World will see a rollup of $235 ($100+$50+$30+$55) for Europe next to the user's own, separate forecast for Europe of $220 ($180+$40). This is depicted in TABLE 1. If the user selects Europe to drill down, then the next rendering would show FAMILY 1 and FAMILY 2 for Europe. Note that France and Germany are not shown because the primary forecast depth is one, which is a relative setting. In this case, World would see rollup values of $180 ($100+$30+$50) for FAMILY 1 and $55 for FAMILY 2 next to his or her own forecasts of $180 for FAMILY 1 and $40 for FAMILY 2. This is depicted in TABLE II. This visibility to the rolled up forecast from direct subordinate users in the organization would continue when the user at the World node selected FAMILY 1.

TABLE I

| | World | | | |
|---|---|---|---|---|
| | Q1 | | Q2 | |
| | Rollup | Own Forecast | Rollup | Own Forecast |
| Americas | | | | |
| Europe | $235 | $220 | | |

TABLE II

| | World -> Europe | | | |
|---|---|---|---|---|
| | Q1 | | Q2 | |
| | Rollup | Own Forecast | Rollup | Own Forecast |
| FAMILY 1 | $180 | $180 | | |
| FAMILY 2 | $55 | $40 | | |

9. Formatting Constraints

Forecasting environments may also impose formatting constraints on forecast data made available to users. Formatting constraints may apply to forecast data displayed to users as well as forecast data entered by users. Forecast data may be displayed in a variety of formats and automatically converted between formats depending upon a format requested by a user. For example, referring to FIG. 5E, a user may request that forecast data contained in forecast data objects 510 be displayed in a particular currency and the forecast data is automatically converted to the requested currency.

As another example, a user may request that forecast data be displayed in unit price, unit volume or total currency amount. Changing the display request causes the forecast data contained in forecast data objects 510 to be automatically shown in the requested format. For example, suppose that a user is viewing forecast data displayed in total currency amount. The user may request to view the data by unit volume or unit price. If the user edits the forecast, a change in unit price causes the total currency amount to be automatically changed to reflect the change in unit price. Having changed the unit price for particular forecast data, if the display format is changed to total currency amount, then the total currency amount displayed is automatically updated to reflect the change in unit price. Similarly, should the user edit unit volume data, the total currency amount will be re-calculated. If the total currency amount itself is changed, either price or unit volume may be adjusted. According to one embodiment, unit volume is changed whenever total currency amount is changed. According to one embodiment, forecast data is maintained by unit price and total currency amount and unit volume is determined dynamically as necessary.

According to one embodiment, a set of formatting attributes is assigned to each node in each hierarchy. All users automatically inherit the attributes of the node to which they are assigned. Forecast data for all other nodes accessed by users are displayed using the user's native attributes. For example, if a user is assigned to the WORLD node 352 that has a total currency amount attribute of USD, then any forecast data viewed by the user from any node is automatically converted (if necessary) and displayed in USD.

In some situations, forecast data at one level does not match forecast data at another level and the differences must be resolved. For example, forecast data for U.S. 362 node may be expressed in U.S. dollars, while forecast data for CANADA node 364 is expressed in Canadian dollars. According to one embodiment, the forecast data for the U.S. 362 node and CANADA 364 node, when rolled up into forecast data at the AMERICAS 356 node is automatically converted into the native format of the AMERICAS 356 node, which may be for example, U.S. dollars. The forecast data for the U.S. 362 node and CANADA 364 node is maintained in the native format of these nodes, i.e., U.S. dollars and Canadian dollars.

Furthermore, there may be "dimensional inconsistency" across forecasts. For example, if a user is assigned to WORLD node 352 and the primary forecasting depth is one (relative) and the secondary forecasting depth is three (absolute), then the read-only data from subordinate users of the WORLD node 352 (AMERICAS node 354 and EUROPE node 356) have more dimensional detail than the forecast of WORLD. That is, with these primary and secondary forecasting depth settings, a user assigned to the WORLD node 352, forecasts product lines LINE1, LINE2, LINE3 and LINE4 in product data hierarchy 450 for EUROPE 354 and AMERICAS 356 in customer data hierarchy 350. In contrast, a user assigned to the EUROPE node 354 with the same primary and secondary forecasting depths, forecasts product lines LINE1, LINE2, LINE3 and LINE4 in product data hierarchy 450 for FRANCE 358 and GERMANY 360 in customer data hierarchy 350. Consequently, forecast data from the EUROPE node 354 is aggregated up from the FRANCE 358 and GERMANY 360 nodes so that a user at the WORLD 352 node may view the data in exactly the same dimensional granularity as that user forecasts in.

10. Consensus Environment

According to one embodiment, a consensus environment is provided for comparing different types of forecast data. The consensus environment is particularly useful for comparing forecast data from different organizations, such as sales (customer oriented) and marketing (product oriented). The consensus environment allows two or more sets of forecast data to be compared and a third set of forecast data to be generated.

This is helpful in resolving discrepancies or inconsistencies in forecasts from different organizations.

Figure 6A:
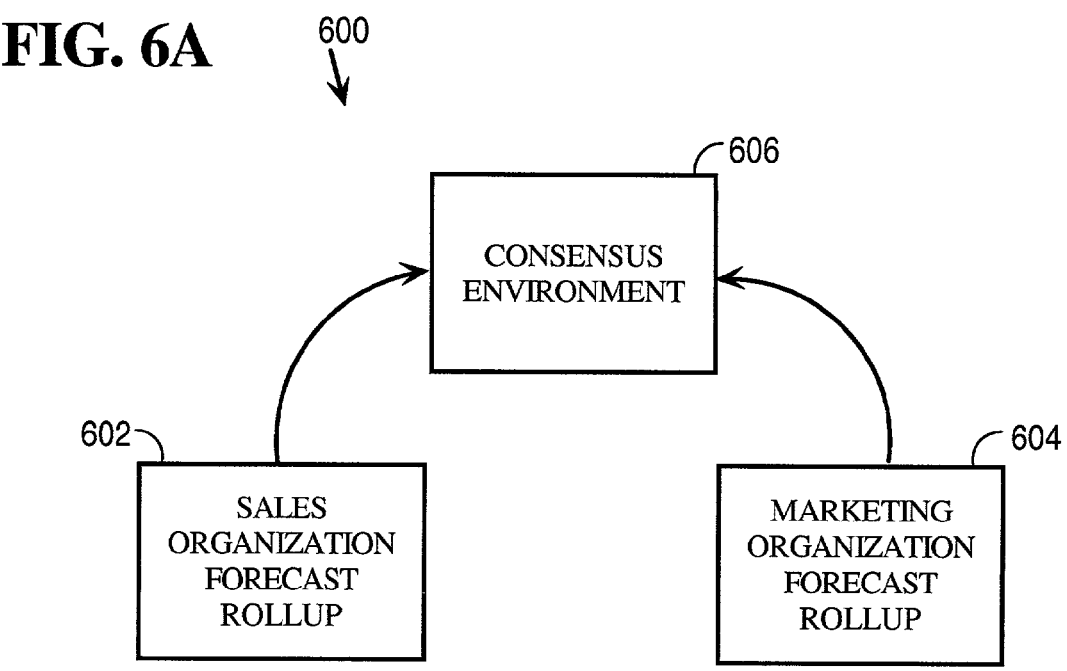
FIG. 6A is a block diagram that depicts the flow of information into a consensus environment.

FIG. 6A is a block diagram 600 that depicts the flow of information into a consensus environment. Forecast data from a sales organization forecast rollup 602 (rolled up along a customer data hierarchy) and a marketing organization forecast rollup 604 (rolled up along a product data hierarchy) is provided to a consensus environment 606. In this example, sales organization forecast rollup 602 is rolled up along customer data hierarchy 350 and marketing organization forecast rollup 604 is rolled up along product data hierarchy 450.

According to one embodiment, forecast data from the users associated with the top nodes of the sales organization forecast rollup 602 and marketing organization forecast rollup 604 are provided to consensus environment 606. A separate set of forecast data is maintained in consensus environment 606. Thus, there are three separate sets of consensus data— the consensus forecast data, the forecast data of the user in the sales organization assigned to the WORLD node 352 and the forecast data of the user in the marketing organization assigned to the TOTAL node 452. These three sets of forecast data may be compared in consensus environment 606. The consensus forecast may then be modified based on the observed discrepancies among the three forecasts to determine a final consensus forecast.

According to one embodiment, each set of forecast data is represented as a set of matrices. For example, each matrix may be a two-dimensional matrix that contains forecast data for a specified period of time, e.g., a fiscal quarter, where each row is associated with a particular level in the product hierarchy and each column is associated with a particular level in the customer hierarchy.

Figure 6B:
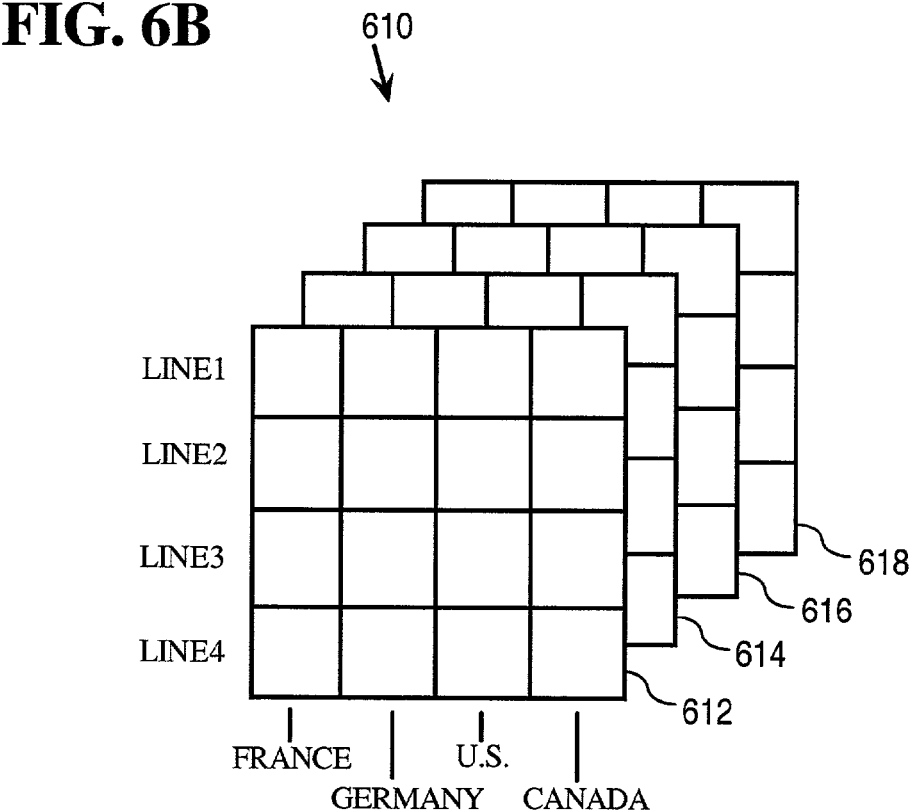
FIG. 6B is a block diagram that depicts a set of two-dimensional matrices where each matrix contains forecast data for a specified period of time.

FIG. 6B is a block diagram 610 that depicts a set of two-dimensional matrices 612, 614, 616, 618 where each matrix contains forecast data for a specified period of time. For example, matrices 612, 614, 616, 618 may contain forecast data for the first four fiscal quarters (Q1-Q4) of a fiscal year. In the present example, the forecast data in each matrix 612, 614, 616, 618 is organized by a certain level of product and customer dimensionality, namely, product line and country. Each perspective (sales, marketing, or consensus) may be organized similarly. Matrices 612, 614, 616, 618 may be organized by other attributes, depending upon the requirements of a particular application.

The matrices for each of the different perspectives for a particular time period may be compared. For example, there will be a separate matrix for the consensus forecast, the forecast from the sales organization user assigned to WORLD node 352 and the marketing organization assigned to TOTAL node 452. These comparisons may lead to discussion among the constituents and then subsequent changes to the consensus forecast.

According to one embodiment, the administrator may select the dimensional granularity of the consensus forecast. In the current example, the consensus forecast is by product line and country, as indicated in FIG. 6B showing the matrix representation of the data. The appropriate dimensional granularity is taken from the user forecasts at the top level of the customer and product hierarchies, matching the dimensional granularity of the consensus forecast. For example, if a user is assigned to WORLD node 352 with a primary forecasting depth of two (relative) and a secondary forecasting depth of four, then this user would forecast each country by product, e.g., U.S. by products P1-P8. However, since the consensus forecast is set at a dimensional granularity of country and product line, then only the aggregation of products into product lines from this user would be available in the comparison matrix in the consensus environment.

FIG. 6C contains a table 620 that depicts a user workflow accomplished in the consensus environment. Table 620 shows the comparison of the forecasts from the users assigned to the root nodes of customer hierarchy 602 and product hierarchy 604. The consensus environment identifies areas of significant divergence between the two forecasts. These are identified in table 620 by reference numerals 622, 624, 626, which correspond to LINE 3 for the U.S., FRANCE and GERMANY. Based upon this information, the consensus forecast may be modified. According to one embodiment, a threshold may be dynamically configured for identifying the divergences.

According to one embodiment, users are provided with a user interface for entering new consensus forecasts based upon discussion among forecast constituents concerning forecast discrepancies. FIG. 6D is an example user interface 640 that allows new consensus forecast data to be entered by users.

11. Implementation Mechanisms

The approach described herein for managing forecast data provides several advantages over conventional approaches. First, the approach provides better control over user access to forecast data. The use of a hierarchical data model allows the forecast environment to be tailored to each user based upon the user's relationship to the hierarchical data model. Second, the approach provides a standard data format and data structure for all users. This allows data to be more easily rolled up to higher levels, without the problems associated with roll ups with conventional forecast data. Third, reconciliation is generally faster because conflicts are generally fewer and more easily resolved than in conventional approaches. Fourth, the approach is ideally suited for real-time environments where forecast data changes rapidly. For example, the approach allows new revenue calculations in profit and loss models to be dynamically updated to reflect changes in real-time forecast data.

The approach described herein for managing forecast data enables companies to rapidly generate accurate revenue and/or bookings forecasts. It can also be used to forecast other sorts of information that have characteristics like revenue forecasts, namely that the information is structured according to certain dimensions and that some aspect of the dimensional forecasts may be added to form a whole. For example, if the product were used to forecast the number of rental cars needed in each location owned by a rental car company, then the dimensions might be geographic location and type of rental car, and by summing all types of rental cars over all geographic locations, one could calculate the total rental car forecast.

The approach for managing forecast data and controlling access to forecast data described herein may be implemented in a variety of contexts and mechanisms and the invention is not limited to any particular context or mechanism. For example, the approach may be integrated into a data management system, such as a database management system, or may be implemented as a stand-alone mechanism or process. One example of a stand-alone mechanism is one that uses a hierarchical data model as described herein to determine which forecast data may be accessed by users. The approach may be implemented in computer hardware, computer software, or any combination of computer hardware and computer software.

The approach may be implemented on a client server model where users generate and provide requests to a forecast data management system. The forecast data management system provides forecast data to the user based upon the users' attributes. With such an arrangement, users may interact with clients via a generic Web browser that sends HTTP requests over the Internet to a forecast data management system configured in accordance with an embodiment. According to one embodiment, the forecast data management system generates responses to the HTTP requests in the form of HTML Web pages that are provided to the user. The user's generic Web browser processes the HTML Web pages to provide the user interface to the forecast data management system.

Figure 7:
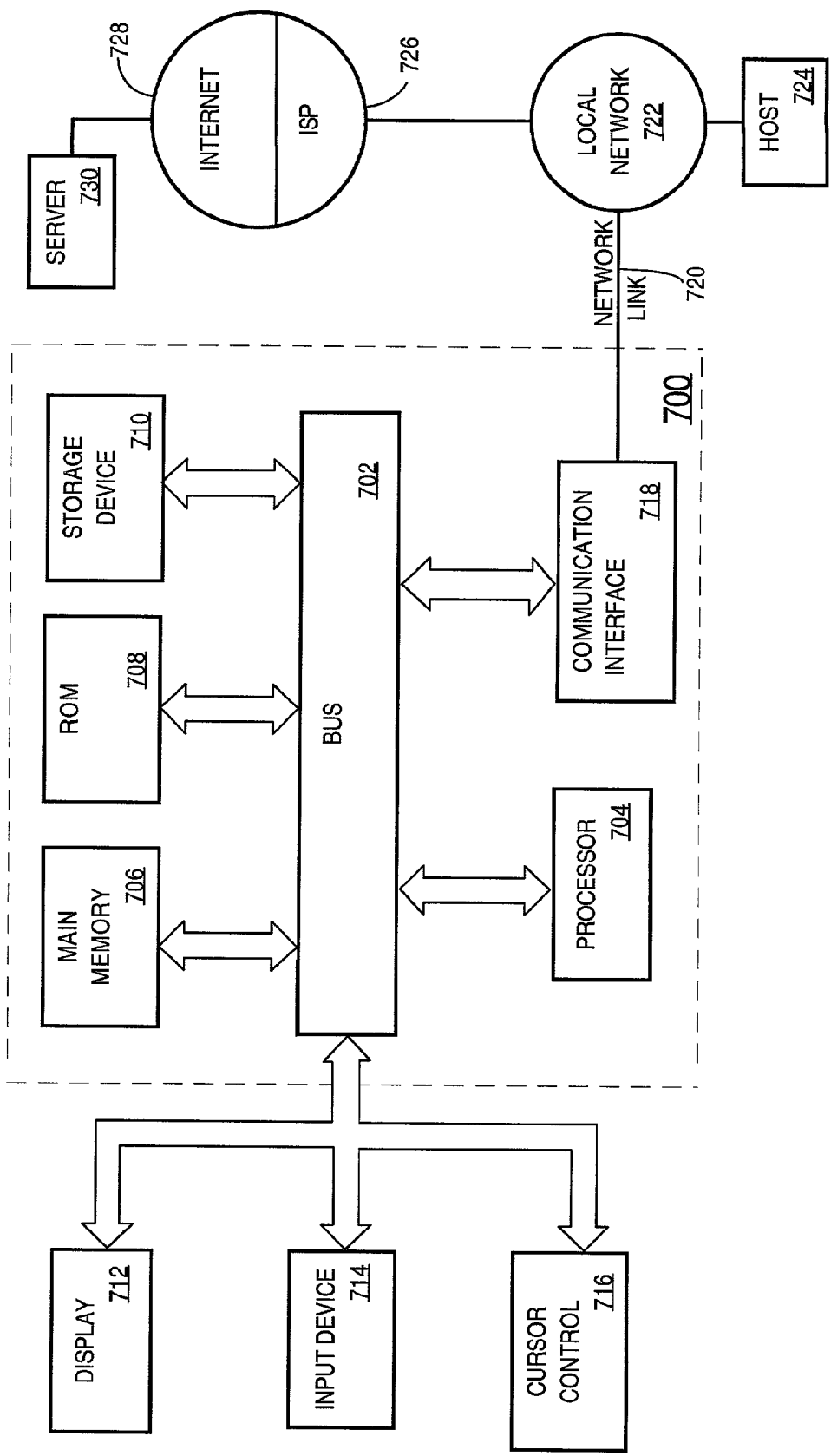
FIG. 7 is a block diagram that depicts a computer system on which an embodiment may be implemented.

FIG. 7 is a block diagram that illustrates a computer system 700 upon which an embodiment may be implemented for managing forecast data. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for managing forecast data. According to one embodiment, the management of forecast data is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for the management of forecast data as described herein.

The received code may be executed by processor 704 as it is received, and/or stored in storage device 710, or other non-volatile storage for later execution. In this manner, computer system 700 may obtain application code in the form of a carrier wave.

12. Example Implementation

The following section describes an example implementation of the approach described herein for managing forecast data. In this example implementation, the approach for managing forecast data is described in the context of an application mechanism that manages forecast data.

12.1 Deployment Architecture

Figure 8:
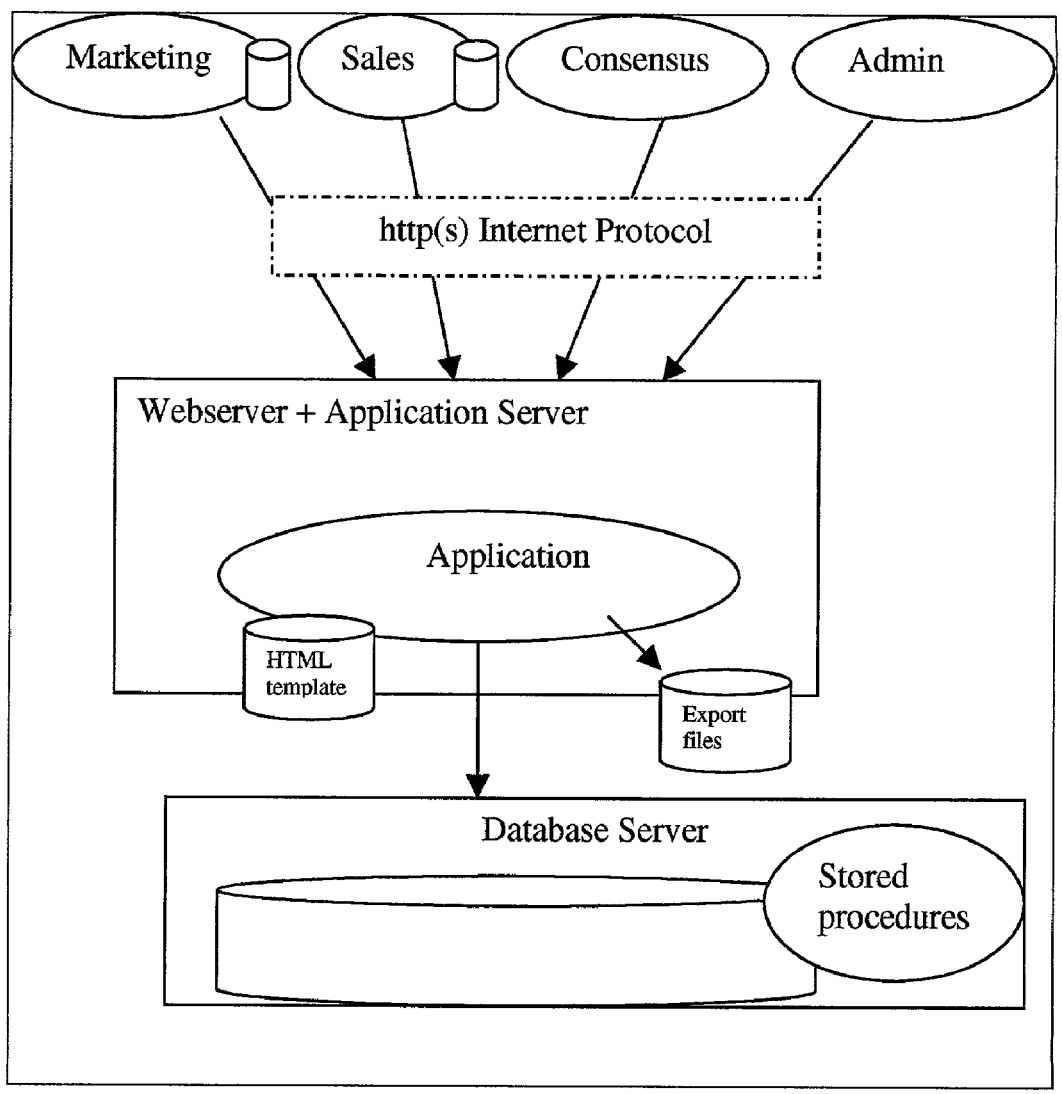
FIG. 8 is a block diagram that depicts an example architecture for implementing the invention in the context of a Web-based application.

Referring to FIG. 8, an example deployment architecture is depicted. In FIG. 8, the application mechanism is a Web-based application. An application user (Marketing, Sales, Consensus, or Admin) logs into the application from a client computer using a generic Web browser such as Microsoft Internet Explorer. The application resides as a servlet in an application server such as Apache Tomcat and is written in the Java programming language. The application server is accessed from a Web server such as the Apache web server. The application logic interprets a user request to view data, or update data, or import or export a file. A user request and the application's response are carried over the HTTP (or HTTPS) Internet protocol. Typically, the application logic involves accessing local memory, local files, or the application database, choosing an algorithm appropriate to the request, and returning a dynamically-generated HTML page back to the user's browser. Certain application functions may be encoded in database-resident stored procedures rather than Java application logic.

12.2 Application Model

12.2.1 Users, Planning Nodes and The UserMap

A user logs into the application. The application maintains a list of valid users and authenticates users upon login. A user logs into a planning node that the user has been authorized to use. For example, a sales user might log into the France planning node. The application maintains a map of currently logged on users and the node that they are currently attached to. The map also records whether the user is an observer; in this case, the user may view planning node data, but may not update it. A user logging into the Consensus Planning node may view forecast reports showing the top of the Sales and Marketing hierarchies. The user may also enter a separate set of forecast data.

12.2.2 Matrices

Once a user logs onto to a planning node, the user has private access to a set of 3-dimensional matrices representing the forecast data for that planning node. These matrices are permanently stored in the application database. Relevant portions of these matrices may be resident (cached) in the memory of the application server. Another user who logs into the same planning node will get their own copy of these matrices. Each matrix represents planning data for a given node. Each matrix has 3 dimensions: product, region, and time. The matrix cells are double-precision floating-point numbers.

Figure 9:
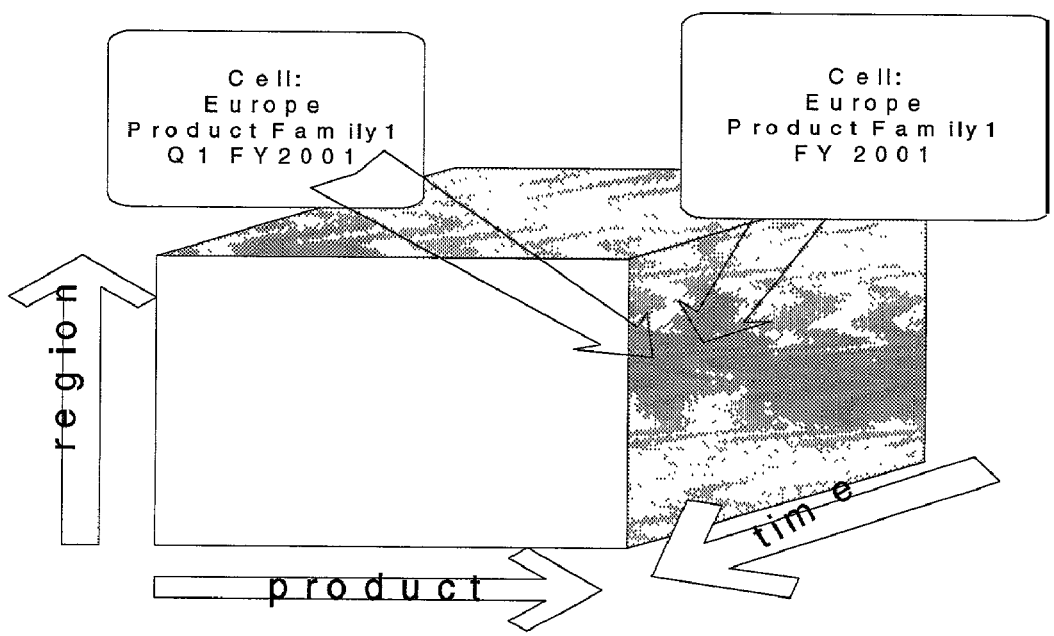
FIG. 9 is a block diagram that depicts a visual representation of a three-dimensional matrix.

FIG. 9 depicts a visual representation of a 3D matrix. In this example, the matrix is represented in the application as a Java array. FIG. 9 depicts two cell positions in the matrix: each cell shares the region hierarchy position (Europe) and the product hierarchy position (Product Family 1), but differs in the time hierarchy position. The matrix is populated from data in the underlying application database. Only certain cells are editable. Other cells are the result of aggregation or other calculations as described herein. A given planning node may also access temporary copies of the node's immediate subordinates matrices. This is necessary so that the application can display subordinate forecasts rolled up alongside plan data.

12.2.2.1 Hierarchy Map and Dimension Sizes

The application maintains a hierarchy map that maps hierarchy nodes in the product, region, or time hierarchies into numerical positions in the matrix. The size of a matrix dimension depends on the forecast depth settings for the planning node and the number of active planning periods in the time dimension. Referring to customer data hierarchy 350 of FIG. 3B, the World sales user's region dimension size would be seven (World, Europe, France, Germany, Americas, US, Canada) if World had a primary forecasting depth of two and would be three (World, Europe, Americas) if World had a primary forecasting depth of one. All user matrices would have the same time dimension size dependent on the number of planning years. The number of planning years is a system configuration variable. For each supported year, the dimension size is 17 (1 year, 4 fiscal quarters, 12 fiscal months). The size of the time dimension is #years*17+1 (century).

12.2.2.2 Planning Data Types

Data held Matrix data is planning data. It represents bookings or revenue forecast data for a node. There are two planning semantics supported by the application: bookings and revenue. There are three planning types supported by the application: total, price, and unit volume. These types enforce the triangular constraint (Price*Volume=Total). Given this constraint, the application is not required to store all three types in the database (two are sufficient to maintain the constraint). Finally, there are two states for data: plan or actuals. Plan data is actively maintained by the application. Actuals data is imported from the ERP system and is read-only. Given these semantics, types, and states, a given user can potentially access 12 (2*3*2) different matrices. The unit volume matrix represents unit volumes as floating point numbers. The bookings and price matrices represent prices in the currently of the planning node as floating point numbers.

12.2.2.3 Editable Cells

The application permits data entry for current and future periods. Data from the past are not editable. A user can edit matrix cells in bookings or revenue semantics for any of the total, price, or unit volume planning types. Users may only edit cells corresponding to the deepest visibility specified by their nodes' forecast depth. Cells at higher levels in the hierarchy are aggregated using the algorithms described below. At the deepest forecast depth in the region and product hierarchy, the user may edit cells at the quarter, month, or year time granularity. The application performs the appropriate allocation or aggregation of the other affected time units.

12.2.3 Request Processing

12.2.3.1 Marketing & Sales: Displaying Data and Drill-Down

Figure 10:
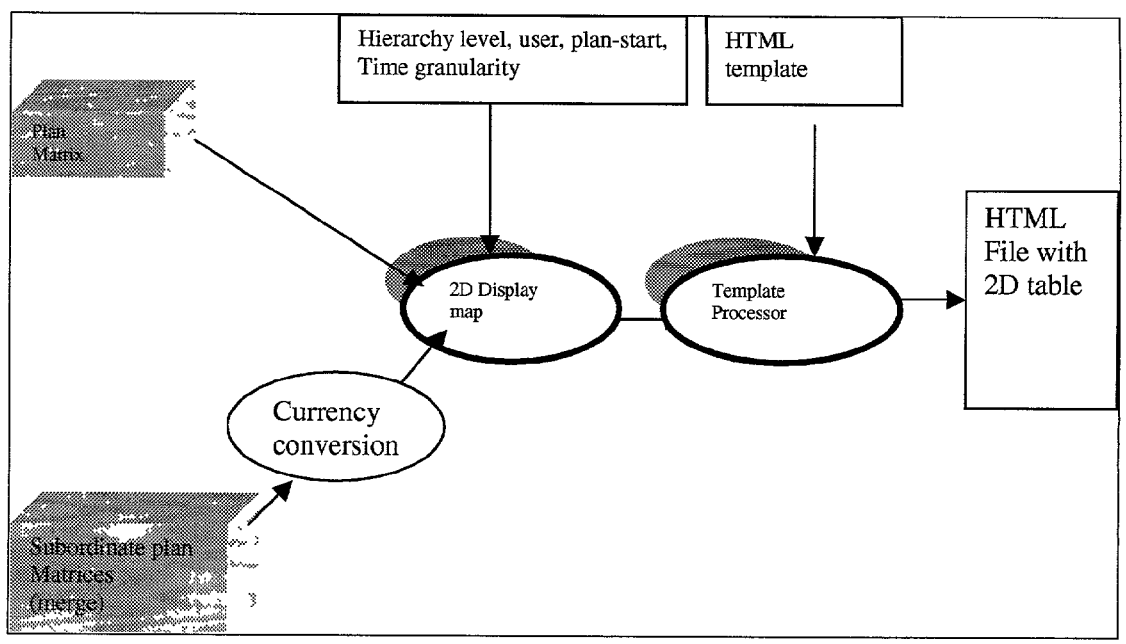
FIG. 10 is a block diagram that depicts an example process by which an application displays tabular two-dimensional data on HTML pages.

FIG. 10 depicts an example process by which the application displays tabular data (2D) data on HTML pages. All tabular data shows time as columns and products or regions as rows. The 2D display map performs this transformation on two 3D Matrices. One is the node's own plan data, the other is a merge of relevant subordinate matrices. For example, the top-level view of the World node viewing the Bookings matrix by month would select 2 2D rows corresponding to the monthly total bookings for Europe and the monthly total bookings for Americas. Part of each row (from past time periods) would come from an actuals matrix and part (from current and future) from the plan matrices. These bookings rows would be in the currency of the World node—not the currency of the subordinates. The template processor inserts these rows into a table template specified by the HTML template and renders a completed HTML page showing the two selected rows.

The same mechanism is used as a user drills down into lower levels. If World drills down into the Europe row, the next page would again have two rows: France and Germany. Again, the 2D display map would select the appropriate rows from World and from its Europe subordinate given the new hierarchy level. The World user can continue drilling down the region hierarchy until he reaches the product hierarchy. At the top of the product hierarchy, the 2D display map would select two columns from the 3D matrices. These columns represent Product Family 1 and 2. The 2D display map renders these matrix columns as rows in the HTML page. As the World user drills to the bottom of the product hierarchy, the same process continues. At leaf levels of the product hierarchy, the display map constructs a 2D table with editable cells that are rendered by the display processor.

12.2.3.2 Marketing & Sales: Entering Data

Marketing and sales users drill-down to the appropriate leaf-levels of the secondary hierarchy and from there can submit changes to their own plan. Users never modify the plans of their subordinates. The application permits these submits to occur in the total, unit-volume, or price semantic. The application permits these submits to occur at the month level, or the quarter level, or the year level. According to one embodiment, the application does compute all rollup values at the time of submission. An alternative implementation is to compute rollups at the time the user requests to see them.

12.2.3.2.1 Modifying Total Semantic

Conceptually, a submit for a particular cell in the total semantic for a particular month (i.e. cell corresponding to Product, Region, Month) is handled in 3 phases:

Rollup of (Product, Region) to Quarter and Year on time dimension

Rollup along Product hierarchy at each of month, quarter, year

Rollup along Region hierarchy at each of month, quarter, year

After this, the application may perform the corresponding action on the related unit volume cells. In practice, unit volume is derived dynamically from Total/Price, so this step is not necessary. If the user chooses to update the total semantic at the quarter level (instead of the month level), the application uses proportional spreading to distribute the quarter to affected months. Similarly, if the year is updated, it uses proportional spreading to distribute to the quarter and month levels. After this adjustment on the time dimension, the calculations proceed as above for the rollup along product and region dimensions.

12.2.3.2.2 Modifying Unit Volume Semantic

Since the unit volume data is not stored in the database, if the user modifies a unit volume cell, the application modifies the affected total semantic cell and proceeds as above.

12.2.3.2.3 Modifying Price Semantic

Unlike total semantic, the price semantic is a rate variable. So, the price value for a quarter is not the sum of the price for the three months that constitute that quarter.

If price is modified at a month level, the application
  Computes the affected total value for that month
  Performs the rollup on the total semantic
  Adjusts the affected rollup cells for price semantic If price is modified at a quarter level, the application
  Modifies all prices for underlying months by the same proportion as the change in price at the quarter level
  Computes the affected total value for that quarter and month
  Performs the rollup of the total semantic
  Adjusts the affected rollup cells for the price semantic Similarly, if price is modified at a year level, the application
  Sets the proportional prices for all the months and quarters in that year
  Computes the affected total value for that year
  Performs the rollup of the total semantic
  Adjusts the affected rollup cells for the price semantic

12.2.3.3 Consensus User: Viewing Data

Figure 11:
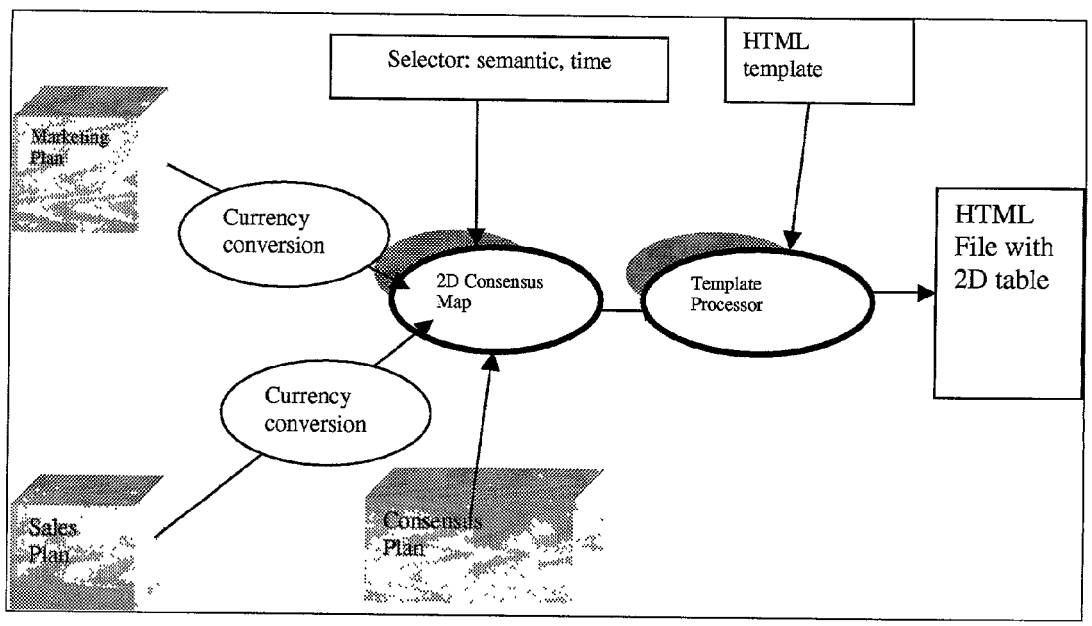
FIG. 11 is a block diagram that depicts the use of a two-dimensional consensus object for viewing consensus data.

As depicted in FIG. 11, the consensus user sees a 2D table where the rows are from the product dimension and columns are from the region dimension. For the chosen semantic and time unit, the 2D consensus Map object selects appropriate cells from the Marketing plan, the sales plan, and the consensus user's own plan. It passes this 2D table onto the template processor that renders the table into an HTML page. Only the consensus user's own data is rendered editable.

12.2.3.4 Consensus User: Modifying Data

The algorithm for modifying consensus data and spreading or aggregating the results are the same as described above.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing access to forecast data, the method comprising the computer executed steps of:
    identifying a user, wherein the user has a position in an organization;
    identifying a first node in a product data hierarchy, wherein the first node is assigned to the user based on the position in the organization, and wherein the product data hierarchy comprises a product root node that corresponds with a broadest product grouping and one or more child nodes that correspond with divisions of the broadest product grouping;
    traversing the product data hierarchy from the first node by a first forecasting depth, wherein the first forecasting depth is assigned to the user based on the organization;
    identifying a first group of one or more nodes at the first forecasting depth from the first node;
    identifying a second node in a customer data hierarchy, wherein the second node is assigned to the user based on the position in the organization, and wherein the customer data hierarchy comprises a customer root node that corresponds with a broadest customer grouping and one or more child nodes that correspond with divisions of the broadest customer grouping;
    traversing the customer data hierarchy from the second node by a second forecasting depth, wherein the second forecasting depth is assigned to the user based on the organization;
    identifying a second group of one or more nodes at the second forecasting depth from the second node; and
    presenting forecast data as a function of the first group of one or more nodes and the second group of one or more nodes.

2. The method as recited in claim 1, further comprising revising the presented forecast data.

3. The method as recited in claim 2, wherein revising the presented forecast data includes specifying a unit volume.

4. The method as recited in claim 2, wherein revising the presented forecast data includes specifying a unit price.

5. The method as recited in claim 2, wherein revising the presented forecast data includes specifying a total currency amount.

6. A computer-readable medium for managing access to forecast data, the computer-readable medium carrying one or more sequences of one or more instructions which, when processed by one or more processors, cause the one or more processors to perform the steps of:

identifying a user, wherein the user has a position in an organization;

identifying a first node in a product data hierarchy, wherein the first node is assigned to the user based on the position in the organization, and wherein the product data hierarchy comprises a product root node that corresponds with a broadest product grouping and one or more child nodes that correspond with divisions of the broadest product grouping;

traversing the product data hierarchy from the first node by a first forecasting depth, wherein the first forecasting depth is assigned to the user based on the organization;

identifying a first group of one or more nodes at the first forecasting depth from the first node;

identifying a second node in a customer data hierarchy, wherein the second node is assigned to the user based on the position in the organization, and wherein the customer data hierarchy comprises a customer root node that corresponds with a broadest customer grouping and one or more child nodes that correspond with divisions of the broadest customer grouping;

traversing the customer data hierarchy from the second node by a second forecasting depth, wherein the second forecasting depth is assigned to the user based on the organization;

identifying a second group of one or more nodes at the second forecasting depth from the second node; and presenting forecast data as a function of the first group of one or more nodes and the second group of one or more nodes.

7. The computer-readable medium as recited in claim 6, further comprising instructions which, when processed by one or more processors, cause the one or more processors to perform the step of revising the presented forecast data.

8. The computer-readable medium as recited in claim 7, wherein revising the presented forecast data includes specifying a unit volume.

9. The computer-readable medium as recited in claim 7, wherein revising the presented forecast data includes specifying a unit price.

10. The computer-readable medium as recited in claim 7, wherein revising the presented forecast data includes specifying a total currency amount.

11. An apparatus for managing forecast data comprising:

a storage device containing a product data hierarchy and a customer data hierarchy, wherein product data hierarchy comprises a product root node that corresponds with a broadest product grouping and one or more child nodes that correspond with divisions of the broadest product grouping, and wherein the customer data hierarchy comprises a customer root node that corresponds with a broadest customer grouping and one or more child nodes that correspond with divisions of the broadest customer grouping; and a processor communicatively coupled to the storage device and configured to:

identify a user, wherein the user has a position in an organization;

identify a first node in the product data hierarchy, wherein the first node is associated with a user assigned to the user based on the position in the organization;

traverse the product data hierarchy from the first node by a first forecasting depth, wherein the first forecasting depth is assigned to the user based on the organization;

identify a first group of one or more nodes at the first forecasting depth from the first node;

identify a second node in the customer data hierarchy, wherein the second node is associated with a user assigned to the user based on the position in the organization;

traverse the customer data hierarchy from the second node by a second forecasting depth, wherein the second forecasting depth is assigned to the user based on the organization;

identify a second group of one or more nodes at the second forecasting depth from the second node; and present forecast data to the user as a function of the first group of one or more nodes and the second group of one or more nodes.

* * * * *

UNITED STATES PATENT AND TRADEMARK OFFICE
CERTIFICATE OF CORRECTION

PATENT NO. : 7,516,084 B1
APPLICATION NO. : 09/905258
DATED : April 7, 2009
INVENTOR(S) : Sankaran et al.

It is certified that error appears in the above-identified patent and that said Letters Patent is hereby corrected as shown below:

In column 2, line 42, delete "pro form a" and insert -- pro forma --, therefor.

In column 2, line 47, delete "forecast slightly" and insert -- forecast in slightly --, therefor.

In column 2, line 47, delete "sales," and insert -- sales --, therefor.

In column 13, line 18, delete "TABLE 1." and insert -- TABLE I. --, therefor.

In column 20, line 22, delete "held Matrix" and insert -- held in Matrix --, therefor.

In column 20, line 32, delete "the ERP" and insert -- an ERP --, therefor.

In column 20, line 35, delete "currently" and insert -- currency --, therefor.

In column 22, line 33, in Claim 1, delete "computer executed" and insert -- computer-executed --, therefor.

Signed and Sealed this

Sixteenth Day of June, 2009

JOHN DOLL
*Acting Director of the United States Patent and Trademark Office*